(12) United States Patent
Bao et al.

(10) Patent No.: US 7,606,973 B2
(45) Date of Patent: Oct. 20, 2009

(54) SYSTEM AND METHOD FOR PERVASIVE COMPUTING WITH A PORTABLE NON-VOLATILE MEMORY DEVICE

(75) Inventors: Zhendong Bao, Marietta, GA (US); Michael Patrick Outlaw, Dallas, GA (US)

(73) Assignee: International Business Machines Corporation, Armonk, NY (US)

( * ) Notice: Subject to any disclaimer, the term of this patent is extended or adjusted under 35 U.S.C. 154(b) by 771 days.

(21) Appl. No.: 10/935,855

(22) Filed: Sep. 8, 2004

(65) Prior Publication Data

US 2006/0070085 A1    Mar. 30, 2006

(51) Int. Cl.
*G06F 13/10* (2006.01)
(52) U.S. Cl. .................. 711/115; 711/100; 719/319
(58) Field of Classification Search .............. 711/115, 711/100; 705/59; 719/319
See application file for complete search history.

(56) References Cited

U.S. PATENT DOCUMENTS

| | | | |
|---|---|---|---|
| 5,870,756 A * | 2/1999 | Nakata et al. .......... 707/200 |
| 5,918,048 A | 6/1999 | Mealey et al. .......... 395/652 |
| 6,003,100 A * | 12/1999 | Lee ...................... 710/301 |
| 6,179,489 B1 * | 1/2001 | So et al. ................ 718/102 |
| 6,539,438 B1 | 3/2003 | Ledzius et al. ............ 710/8 |
| 6,606,742 B1 | 8/2003 | Orton et al. ............ 717/140 |
| 7,184,372 B2 * | 2/2007 | Lee et al. ............ 369/30.32 |
| 2002/0004854 A1 | 1/2002 | Hartley ................ 709/328 |
| 2002/0147912 A1 | 10/2002 | Shmueli et al. ......... 713/182 |
| 2003/0028760 A1 | 2/2003 | Chang et al. .............. 713/2 |
| 2003/0051075 A1 * | 3/2003 | Purpura .................. 710/1 |
| 2004/0001088 A1 | 1/2004 | Stancil et al. ........... 345/748 |
| 2004/0015694 A1 | 1/2004 | DeTreville .............. 713/172 |
| 2004/0015960 A1 | 1/2004 | Wanchoo et al. .......... 717/178 |
| 2004/0039860 A1 | 2/2004 | Mills et al. ............ 710/301 |
| 2005/0015702 A1 * | 1/2005 | Shier et al. ............ 714/776 |
| 2006/0047604 A1 * | 3/2006 | Kraft-Oz et al. ........... 705/59 |
| 2006/0070085 A1 * | 3/2006 | Bao et al. .............. 719/319 |
| 2007/0252954 A1 * | 11/2007 | McGuire et al. ......... 353/20 |

OTHER PUBLICATIONS

IBM Technical Disclosure Bulletin, vol. 39, No. 1, Jan. 1996, "Device Drivers via the Access Bus", p. 135.

* cited by examiner

*Primary Examiner*—Tuan V Thai
*Assistant Examiner*—Yong Choe
(74) *Attorney, Agent, or Firm*—Yee & Associates, P.C.; John R. Pivnichny

(57) ABSTRACT

A method, computer program product, and a data processing system for providing pervasive computing with a removable non-volatile memory device is provided. A portable operating system receives a command for removal of a portable memory device from a first host. A running application that is stored on the portable memory device is identified. Application state data of the application is saved in a data structure stored on the portable memory device. The portable memory device may then be removed from the first host and connected with a second host. A determination is made of whether the second host is adapted to run the application. The saved state data is retrieved responsive to determining that the second host is adapted to run the application, and the application is restored to an application state at which the state data was saved.

11 Claims, 5 Drawing Sheets

SYSTEM AND METHOD FOR PERVASIVE COMPUTING WITH A PORTABLE NON-VOLATILE MEMORY DEVICE

BACKGROUND OF THE INVENTION

1. Technical Field

The present invention relates generally to an improved data processing system and in particular to a method and apparatus for optimizing portability of a removable non-volatile memory device. Still more particularly, the present invention provides a method and apparatus for providing pervasive computing across multiple platforms with a portable non-volatile memory device.

2. Description of Related Art

A portable non-volatile memory device, such as a hot swappable hard drive or memory stick, may be removed from one device and inserted into another device. Upon insertion of the memory device into a new host device, the memory device is presented as additional storage space. Data stored on the memory device from the previous host device is then retrievable on the new host device.

However, state data of applications that were running on the previous host device when the memory device was removed is not saved. Thus, a user session of an application run from the removable non-volatile memory device is lost upon removal of the memory device from the previous host device. Additionally, application data that is saved on the removable non-volatile memory device is not accessible if an application instance suitable for processing of the application data is not installed on the new host device. Moreover, an output format of an application on the memory device may not be presentable on the new host device if the new host device is not equipped with an output device capable of processing data in the output format of the application.

Thus, it would be advantageous to provide a mechanism for maintaining state data of an application running when a removable non-volatile memory device is removed from one host device and connected with another host device. It would be further advantageous to provide a mechanism for providing output of an application on different output devices dependent on a host device output capability.

SUMMARY OF THE INVENTION

The present invention provides a method, computer program product, and a data processing system for providing pervasive computing with a removable non-volatile memory device. A portable operating system receives a command for removal of a portable memory device from a first host. A running application that is stored on the portable memory device is identified. Application state data of the application is saved in a data structure stored on the portable memory device. The portable memory device may then be removed from the first host and connected with a second host. A determination is made of whether the second host is adapted to run the application. The saved state data is retrieved responsive to determining that the second host is adapted to run the application, and the application is restored to an application state at which the state data was saved.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
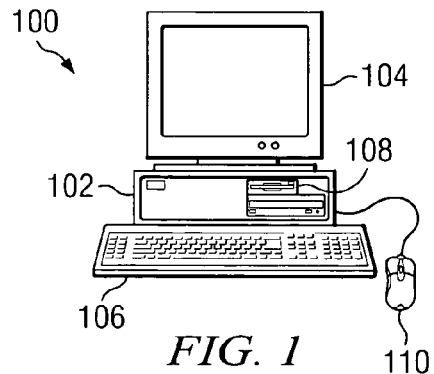
FIG. 1 is a pictorial representation of a data processing system in which the present invention may be implemented in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer computer or IntelliStation computer, which are products of International Business Machines Corporation, located in Armonk, New York. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
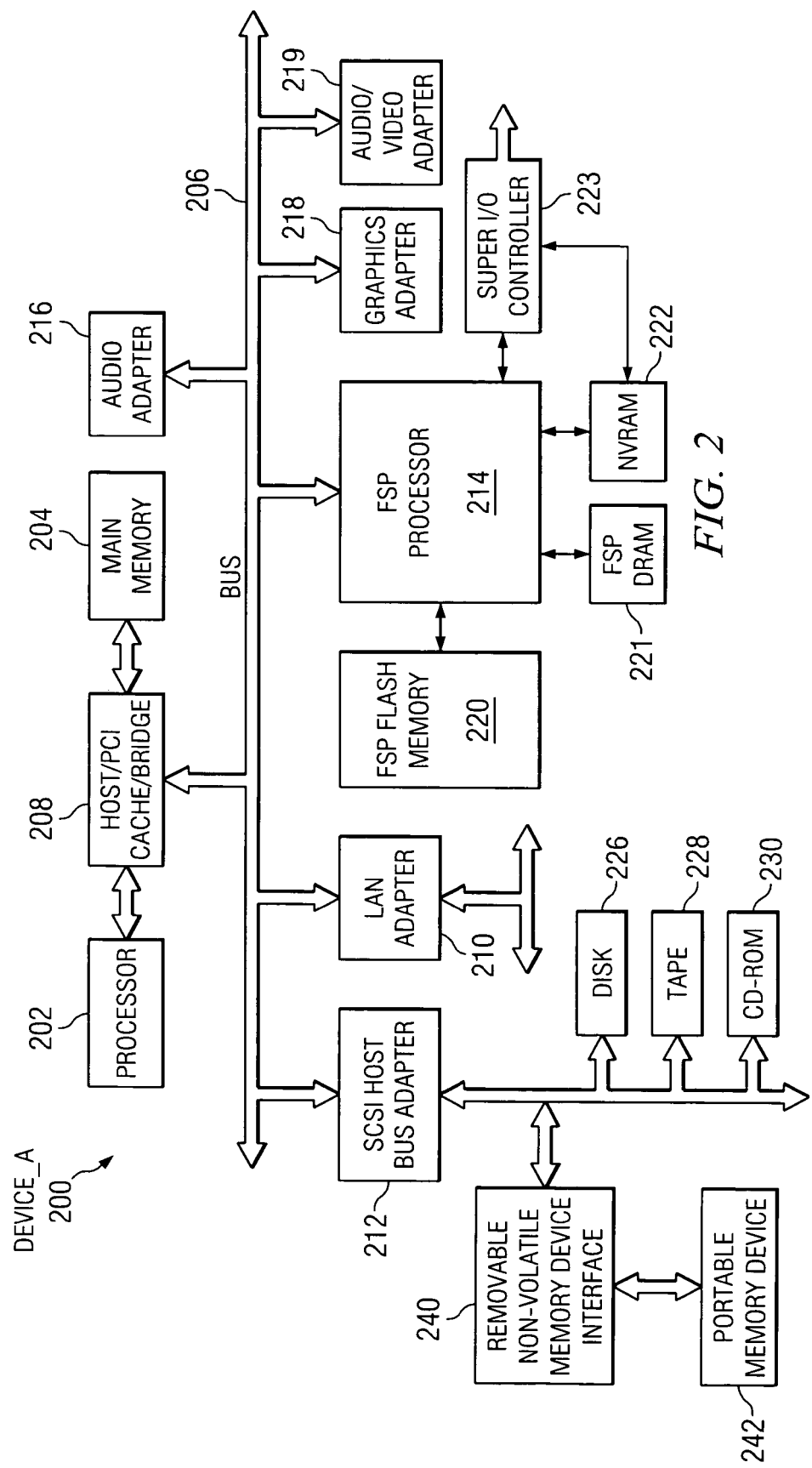
FIG. 2 is a block diagram of a data processing system that may host a portable memory device in accordance with a preferred embodiment of the present invention.

With reference now to FIG. 2, a block diagram of a data processing system that may host a removable non-volatile memory device (also referred to herein as a portable memory device) is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP)

and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in connectors. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

Additionally, a removable non-volatile memory device interface (I/F) 240 may be coupled with local bus 206 via SCSI host bus adapter 212. A portable memory device 242 is removably connected with removable non-volatile memory device interface 240. For example, removable non-volatile memory device interface 240 may be implemented as a universal serial bus (USB) socket and associated circuitry, and portable memory device 242 may be implemented as a hot swappable USB hard disk, flash memory card, or another suitable peripheral device featuring a non-volatile memory storage. When portable memory device 242 is inserted into removable non-volatile memory device interface 240, data processing system 200 is said to be the host of portable memory device 242. Portable memory device 242 may be removed from data processing system 200 and connected with another data processing system or computational device that includes a suitable peripheral interface for accommodating portable memory device 242. In accordance with a preferred embodiment of the present invention, non-volatile memory device 242 may be removed from one host and connected with another host in a manner such that open application state data is maintained across the platforms as described more fully below.

An operating system runs on processor 202 and is used to coordinate and provide control of various components within data processing system 200 in FIG. 2. The operating system may be a commercially available operating system such as Windows XP, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230. In that case, the computer, to be properly called a client computer, includes some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226-230, in conjunction with instructions located on portable memory device 242.

Figure 3:
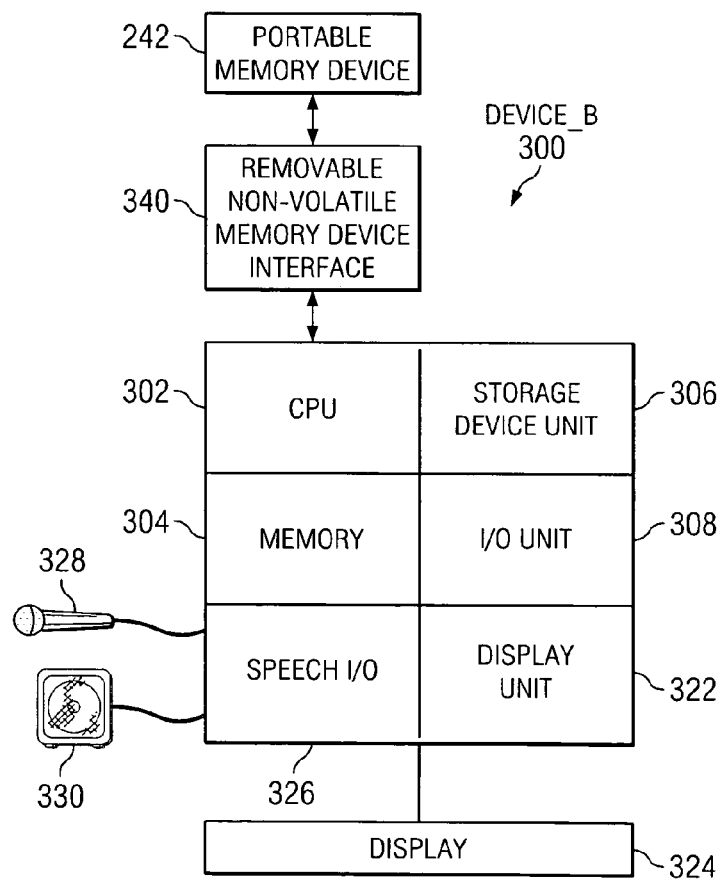
FIG. 3 is a block diagram of an automotive computing platform that may host a portable memory device in accordance with a preferred embodiment of the present invention.

Turning next to FIG. 3, a block diagram of an automotive computing platform that may host a portable memory device is depicted in accordance with a preferred embodiment of the present invention. Computing device 300 is located within a vehicle, such as an automobile or truck. Computing device 300 includes a CPU 302, which may be an embedded processor or processor such as a Pentium processor from Intel Corporation. "Pentium" is a trademark of Intel Corporation. Computing device 300 also includes memory 304, which may take the form of random access memory (RAM) and/or read only memory (ROM).

Computing device 300 also contains a storage device unit 306. Storage device unit 306 may contain one or more storage devices, such as, for example, a hard disk drive, a DVD drive, a floppy disk, or another similar device. Automotive computing device 300 also includes an input/output (I/O) unit 308, which provides connections to various I/O devices.

Computing device 300 may also include a display adapter 322, which is connected to display 324. In the depicted example, this display is a touch screen display. Alternatively or in addition to a touch screen display, display 324 also may employ a heads-up display projected onto the windshield of the automobile. Computing device 300 also includes a microphone 328 and a speaker 330 to provide a driver with an ability to enter commands and receive responses through speech I/O 326 without having to divert the driver's attention away from the road, or without the driver having to remove the driver's hands from the steering wheel.

A removable non-volatile memory device interface 340 accepts insertion and removal of portable memory device 242. Thus, computing device 300 may operate as a host of portable memory device 242. Computing device 300 is provided as an exemplary platform and is described only to facilitate an understanding of the invention. Portable memory device 242 may be hosted by any number of data processing system or computational device implementations, and mechanisms of the present invention may be similarly applied in such systems.

Figure 4:
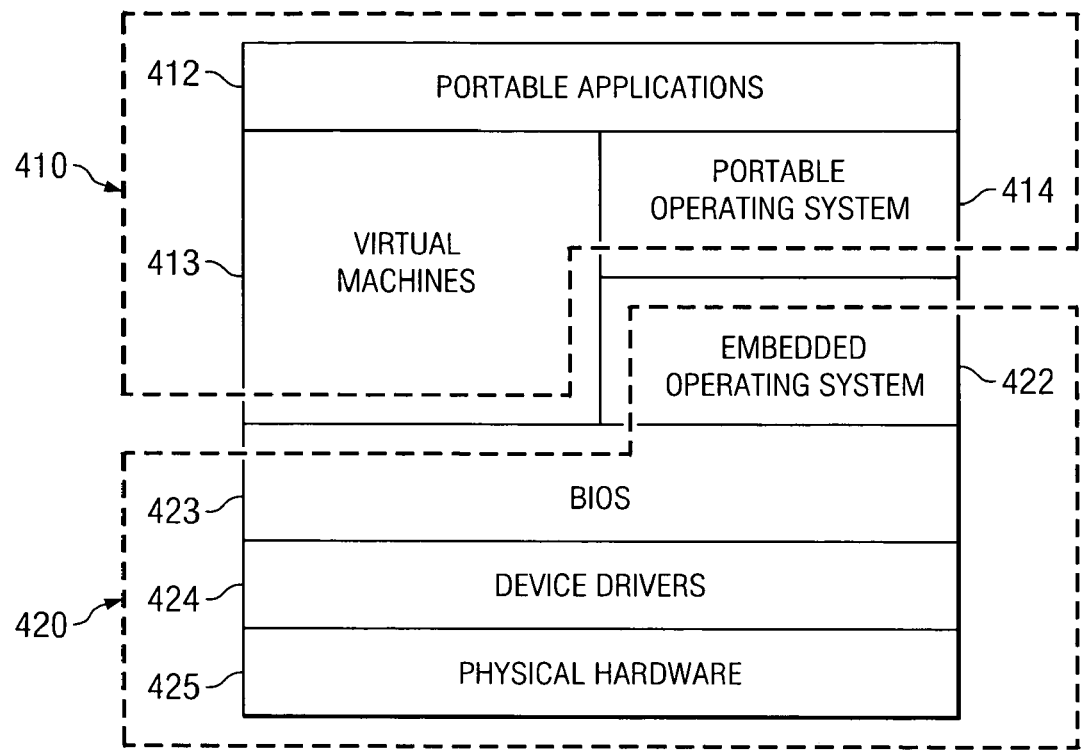
FIG. 4 is a diagrammatic illustration of a software configuration for providing optimized portability of a portable memory device in accordance with a preferred embodiment of the present invention.

FIG. 4 is a diagrammatic illustration of a software configuration for providing optimized portability of a portable memory device in accordance with a preferred embodiment of the present invention. In the illustrative example, software entities 410 are located on portable memory device 242, and software entities 420 are located on a host device, such as data processing system 200 shown in FIG. 2 or computing device 300 shown in FIG. 3, that supports the portable memory device 242. Portable applications 410, such as word processors, Internet browsers, or any other suitable portable application program, run on portable O/S 414. One or more virtual machines 413, e.g., a Java Virtual Machine instance, are preferably included in portable memory device 242 that facilitate cross-platform execution of application programs maintained on non-volatile memory device 242.

Portable O/S 414 running on non-volatile memory device 242 interfaces with embedded O/S 422 running on the host data processing system. Basic input/output system (BIOS) 423 provides an interface with peripheral devices by way of device drivers 424 that interact with host physical hardware 425, e.g., an Ethernet card, central processing unit, or the like.

In accordance with embodiments of the invention, state data of open applications is saved on portable memory device 242 prior to removal of portable memory device 242 from a host. Upon connection of portable memory device with another host, an evaluation of one or more applications stored on portable memory device 242 is made to determine if the application can be presented on the new host. If the application may be presented on the new host, any saved state data is retrieved and the previous application session is restored. Additionally, transcoding of application data may be performed to facilitate presentation of an application on a new host. For example, a host device may not include an output device for display of a native output of an application. In such an instance, the portable O/S may transcode the application output into a format suitable for the current host device. For example, an application may provide output in a visual format for display on a graphical display device. In the event that a host device lacks a suitable display device but includes a speaker output device, the portable O/S may transcode the visual output of an application into an audible format for output over the speaker.

Figure 5:
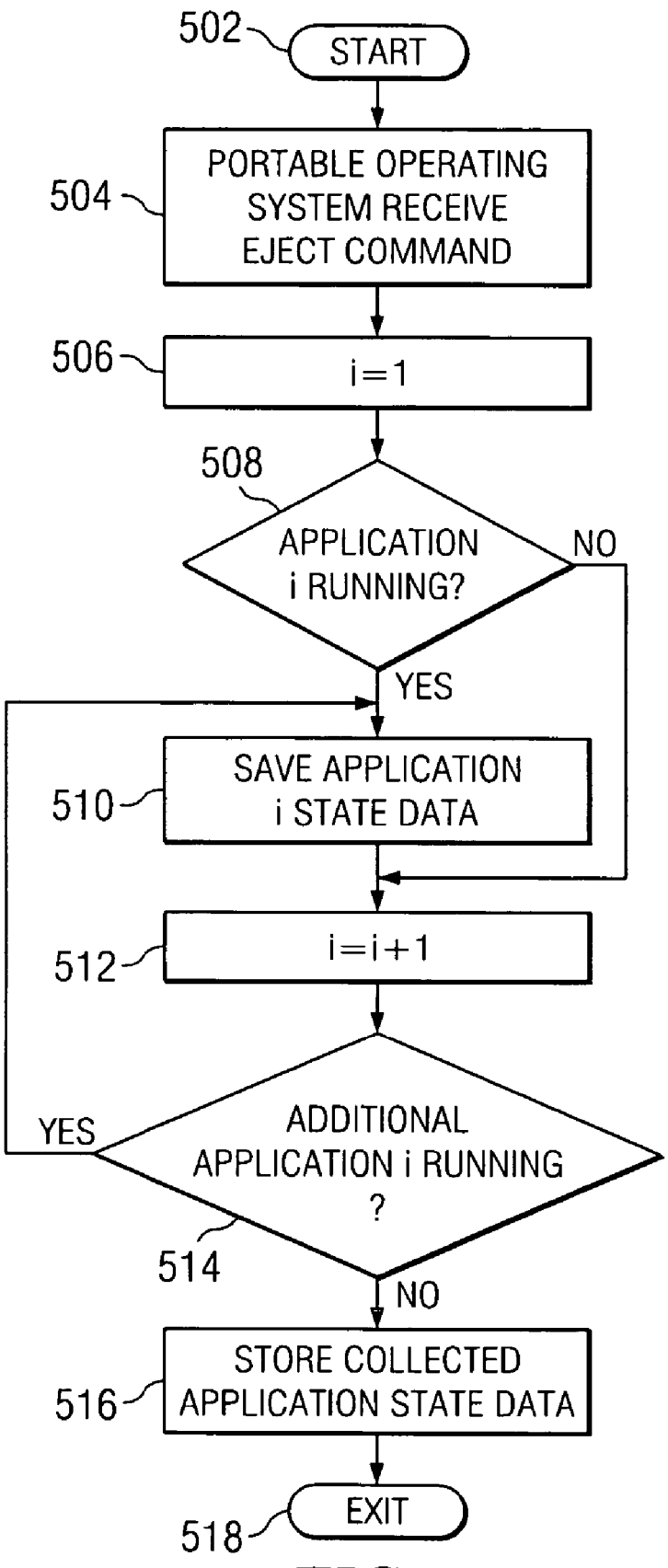
FIG. 5 is a flowchart of an application state data collection routine process performed by a portable operating system of a portable memory device in accordance with a preferred embodiment of the present invention.

FIG. 5 is a flowchart of an application state data collection routine process performed by a portable operating system of a portable memory device in accordance with a preferred embodiment of the present invention. The state data collection routine is initiated (step 502) and may run in a background mode or may be invoked by receipt of a procedure call or other mechanism. Portable O/S 414 receives a prompt for removal of memory device 242 from a current hosting device, e.g., on activation of an eject button of memory device 242, execution of a hibernate function, or supply of another suitable remove command (step 504). A counter i is initiated to one or another suitable index value for indexing or identifying an application running at the time the removal command is received by portable O/S 414 (step 506). Portable O/S 414 then evaluates application i to determine if it is running (step 508). In the event that application i is not running, portable O/S proceeds to increment counter variable i (step 512). If application i is determined to be running at step 508, state data or other parameters necessary for later restoration of the current session of application i are collected by O/S 414 (step 510). For example, application state data may be temporarily stored by O/S 414 in a temporary memory allocation of memory device 242. The counter variable i is then incremented according to step 512.

Upon incrementing counter variable i at step 512, O/S 414 then evaluates whether an additional application i is running (step 514). In the event that an additional application i is determined to be running, O/S 414 then returns to step 510 to save application state data of the running application i. When application state data for each running application is saved, O/S 414 stores the collected application state data (step 516) on portable memory device 242, and the application state data collection routine exits (step 518).

Figure 6:
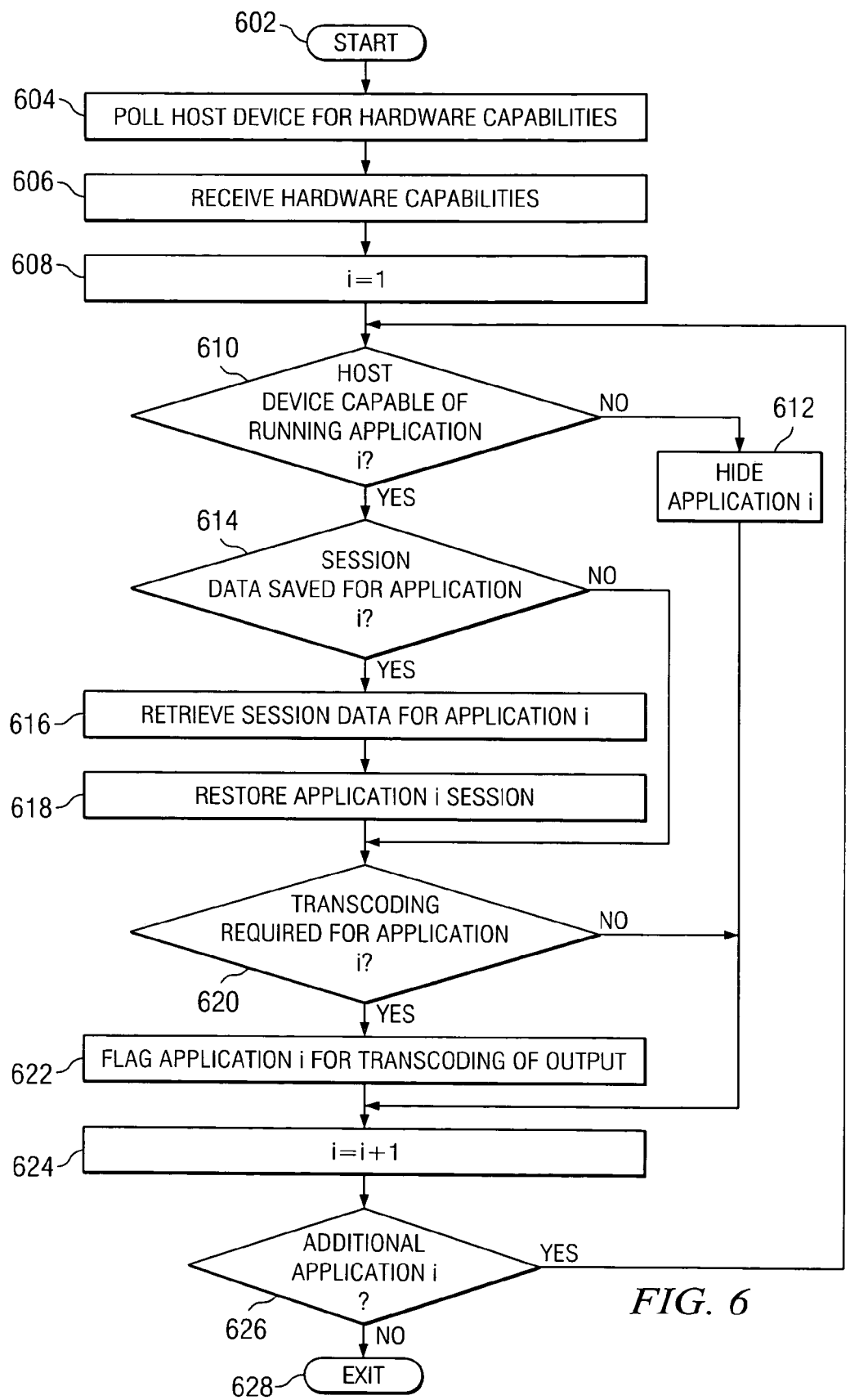
FIG. 6 is a flowchart of a session restoration routine process performed by a portable operating system of a portable memory device upon insertion of the portable memory device into a host device in accordance with a preferred embodiment of the present invention.

FIG. 6 is a flowchart of a session restoration routine process performed by a portable operating system of a portable memory device upon insertion of the portable memory device into a host device in accordance with a preferred embodiment of the present invention. The session restoration routine is initiated (step 602) and portable O/S 414 polls the host device for hardware capabilities of the host device (step 604). The hardware capabilities of the host device are received by the portable O/S (step 606), and a counter i is initialized to one (step 608). Portable O/S 414 then determines if the host device is capable of running application i maintained by portable memory device 242 (step 610). If it is determined that the host device is not capable of running application i, portable O/S 414 hides application i so that is unavailable to the user (step 612) and proceeds to increment the counter i (step 624).

Returning again to step 610, if portable O/S 414 determines that the host device is capable of running application i, portable O/S 414 then evaluates whether session data has been saved for application i (step 614). If no session data has been saved for application i, the session restoration routine proceeds to evaluate whether transcoding of application i output is required for the current host device (step 620). For example, an application that is maintained by portable memory device 242 may generate output formatted for visual output on a display device. However, a host device may not include an output device for display of the application output. In such an instance, the portable O/S may transcode the application output into a format suitable for the current host device, e.g., the portable O/S may transcode the visual output into an audible format for output over a speaker.

Returning again to step 614, if saved session data for application i is identified, portable O/S 414 retrieves the saved session data (step 616) and restores application i to its previous running state (step 618). The portable O/S then proceeds to evaluate whether transcoding of application i output is required for presentation of application i output on the output device capabilities of the current host device according to step 620. If transcoding of application i output is not necessary, portable O/S 414 proceeds to increment counter i according to step 624. If it is determined at step 620 that transcoding of application i output is required, application i is flagged or otherwise designated for transcoding (step 622) on the current host device, and portable O/S 414 proceeds to increment counter i according to step 624.

After incrementing counter i, an evaluation is made to determine whether an additional application remains for evaluation of a potential session restoration and transcoding evaluation (step 626). If an additional application i remains to be evaluated, the session restoration routine processing returns to step 610 to determine if the host device is capable of running application i. Alternatively, the session restoration processing routine exits (step 628).

Figure 7:
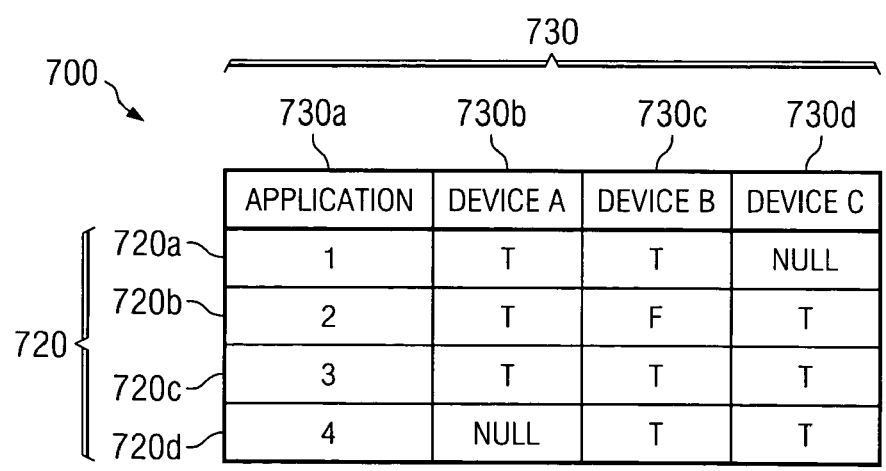
FIG. 7 is a diagrammatic illustration of a data structure that facilitates portability optimization of a memory device in accordance with a preferred embodiment of the present invention.

FIG. 7 is a diagrammatic illustration of a data structure that facilitates portability optimization of a portable memory device in accordance with a preferred embodiment of the present invention. In the illustrative example, a data structure is illustratively represented as table 700 although other data structures may be suitably substituted therefor. Table 700 is stored on portable memory device 242 and processed by a processing unit of the host device.

Table 700 comprises a plurality of records 720 and fields 730. Each record 720a-720d, or row, comprises data elements in respective fields 730a-730d. In the illustrative example, fields 730a-730d have respective labels of "Application", "Device A", "Device_B", and "Device_C." Data elements of field 730a comprise integer values that provide a reference, or identifier, to an application maintained on portable memory device 242. In the illustrative example, four applications are maintained on portable memory device 242 each identified by one of integers 1-4 maintained in field 730a.

Fields 730b-730d are respectively associated with a host device (Device_A-Device_C) that may accept non-volatile memory device 242. Fields 730b-730d maintain data elements that indicate whether output of an application identified in field 730a of a common record may be presented on a particular device. Particularly, fields 730b-730d contain data elements that comprise a Boolean True (T) data element value, a Boolean false (F) data element value, or a null (NULL) data element value that respectively indicate that the device may present application output, the device can not present application output, and the application was not open at the time of the most recent removal of portable memory device 242.

A data element of a particular field 730b-730d identifies whether the host device associated with the field may present output data of an application identified in field 730a of the corresponding record. For example, the data element value of field 730b of record 720a indicates that the device (Device_A) may present output data of the application (Application 1) assigned to record 720a. The data element value of False of field 730c in record 720b indicates that the device (Device_B) cannot present output data of the application (Application 2) assigned to record 720b. In the illustrative example, a null data element, e.g., the data element of field 730b in record 720d, indicates that the application identified by field 730a data element was not opened or running at the time of the previous portable memory device removal.

To better facilitate an understanding of the invention, consider the following scenario. Assume that portable memory device 242 is first connected with data processing system 200 that is designated Device_A. While portable memory device 242 is connected with data processing system 200, assume that applications 1-3 are opened with each application generating respective application state data. In the present example, assume that the user prompts the host device for removal of portable memory device 242 by supply of a removal command to data processing system 200, e.g., by supply of a user command to an input device such as keyboard and mouse adapter 220. Responsive to receipt of the removal command, portable memory device 242 saves user session data, e.g., outstanding output data to be delivered to an output device, application state data of respective applications 1-3, or the like. For example, application state data of each of applications 1-3 maintained on portable memory device 242 that are currently running may be stored on portable memory device 242 and indexed according to respective application identifiers. When the user session data is saved, portable memory device 242 may be removed from the currently hosting device and later inserted into another host device.

Continuing with the present example, assume that portable memory device 242 is later inserted into removable non-volatile memory device interface 340 of computing device 300 designated Device_B shown in FIG. 3. On insertion of portable memory device 242 into computing device 300, portable O/S 414 identifies computing device 300 as Device_B and interrogates table 700 for application presentation capabilities of computing device 300. On interrogation of table 700, portable O/S 414 reads the data elements of field 730c to determine if the saved user session data of applications 1-3 that were opened when portable memory device 242 was removed from previous host 200 are to be retrieved. Particularly, portable O/S 414 determines that computing device 300 may present application 1 by reading the data element (T) of field 730c in record 720 assigned to application 1, retrieves session data of application 1 maintained on portable memory device 242, and restores application 1 to a running state on computing device 300. Portable O/S 414 reads the data element (F) in field 730c of record 720b assigned to application 2 and determines that application 2 is not presentable on computing device 300. Thus, the user session data of application 2 is not retrieved from portable memory device 242, and application 2 is hidden from the user. Additionally, portable O/S 414 reads data element (T) from field 730c of record 720c and determines that application 3 may be presented on computing device 300. Accordingly, portable O/S 414 retrieves the saved session data of application 3 and restores application 3 to a running state on computing device 300. Portable O/S 414 then determines that application 4 is presentable on computing device 300 by reading the data element of field 700c in record 720d assigned to application 4. No session data is saved for application 4 and thus an application restoration is not performed by portable O/S 414. Because application 4 may be presented on computing device 300, portable O/S 414 does not hide application 4. Accordingly, application 4 may be opened by the user at any time portable memory device 242 is coupled with computing device 300. Session data of any open applications is saved on supply of a command for removal of portable memory device from computing device 300 in a manner similar to that described above.

Preferably, portable O/S 414 provides for output transcoding when a host device does not have a suitable capability for output of a native application output data format. As referred to herein, a native application output data format is an output format generated by an application. Preferably, portable O/S 414 queries a host device for the hardware capabilities upon insertion of portable memory device 242 into a host device. For example, portable O/S 414 may query a host device for sound playback capabilities of the new host device, display device resolution, if any, of the new host device, and types of I/O devices that the new host device supports. Hardware capability queries of the new host device may be performed by interrogation of host BIOS 423 by portable O/S 414. Based on the hardware query results, portable O/S 414 can determine whether transcoding of application data is necessary for presentation of application data on the new host device.

As described, a mechanism for maintaining state data of an application running when a portable memory device is removed from one host device and connected with another host device is provided by the present invention. Application output may be provided on different output devices dependent on a host device output device capability. Application sessions may thus be maintained across multiple computing platforms having different output capabilities by use of a portable memory device.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, and DVD-ROMs. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for providing pervasive computing with a removable non-volatile memory device, the method comprising the steps of:
   receiving, by a portable operating system, a command for removal of a portable memory device from a first host;
   responsive to receiving the command, identifying an application as running, wherein the application is stored on the portable memory device;
   saving application state data of the application in a data structure stored on the portable memory device;
   responsive to saving the application state data, the portable memory device being removed from the first host;
   the portable memory device being connected with a second host;
   determining whether the second host has the hardware capabilities that are required to run the application, wherein the second host is capable of running the application if the second host has the hardware capabilities, and further wherein the second host runs the application without requiring permission to run the application as long as the second host has the hardware capabilities; and
   responsive to determining that the second host is not capable of running the application, designating the application as hidden such that execution of the application may not be attempted on the second host.

2. The method of claim 1, further comprising:
   responsive to determining that the second host is capable of running the application, retrieving the application state data of the application; and
   restoring the application to a running state at which the application state data was saved.

3. The method of claim 1, wherein the step of determining further comprises:
   interrogating the second host for hardware capabilities of the second host.

4. The method of claim 3, wherein the hardware capabilities include hardware capabilities of output devices of the second host.

5. The method of claim 1, wherein the application produces data output of a first format and a determination is made that the second host is capable of running the application, the method further comprising:
   determining whether the second host has output device capabilities suitable for output of data in the first format.

6. The method of claim 5, further comprising:
   responsive to determining that the second host does not have output device capabilities suitable for output of data in the first format, transcoding data output in the first format into output data of a second format, wherein the second host has output capabilities suitable for output of data in the second format.

7. The method of claim 5, further comprising:
   responsive to determining that the second host does have output device capabilities suitable for output of data in the first format, projecting the data onto the windshield of an automotive vehicle in which the second host is included.

8. A method within a first automotive vehicle for providing pervasive computing with a removable non-volatile memory device, the method comprising the steps of:
   receiving, by a portable operating system, a command for removal of a portable memory device from a first host that is included in the first automotive vehicle;
   responsive to receiving the command, identifying an application as running, wherein the application is stored on the portable memory device;
   saving application state data of the application in a data structure stored on the portable memory device;
   responsive to saving the application state data, removing the portable memory device from the first host; and
   wherein the portable memory device is capable of being connected to a second host that is included in a second automotive vehicle, wherein the second host runs the application if the second host has the hardware capabilities that are required to run the application.

9. The method of claim 8, wherein the application produces data output of a first format and a determination is made that the second host is capable of running the application, the method further comprising:
   determining whether the second host has output device capabilities suitable for output of data in the first format.

10. The method of claim 9, further comprising:
    responsive to determining that the second host does not have output device capabilities suitable for output of data in the first format, transcoding data output in the first format into output data of a second format, wherein the second host has output capabilities suitable for output of data in the second format.

11. The method of claim 9, further comprising:
    responsive to determining that the second host does have output device capabilities suitable for output of data in the first format, projecting the data onto the windshield of the second automotive vehicle.

* * * * *

UNITED STATES PATENT AND TRADEMARK OFFICE
CERTIFICATE OF CORRECTION

PATENT NO. : 7,606,973 B2
APPLICATION NO. : 10/935855
DATED : October 20, 2009
INVENTOR(S) : Bao et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 879 days.

Signed and Sealed this

Twelfth Day of October, 2010

David J. Kappos
*Director of the United States Patent and Trademark Office*